(12) United States Patent
Tischler et al.

(10) Patent No.: US 11,500,749 B2
(45) Date of Patent: Nov. 15, 2022

(54) DISTRIBUTED DATA STORE FOR TESTING DATA CENTER SERVICES

(71) Applicant: EMC IP Holding Company LLC, Hopkinton, MA (US)

(72) Inventors: Wyatt Tischler, Hollis, NH (US); Brian Simons, Oro Valley, AZ (US); Antony Qin, North Grafton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 133 days.

(21) Appl. No.: 16/930,915

(22) Filed: Jul. 16, 2020

(65) Prior Publication Data
US 2022/0019508 A1 Jan. 20, 2022

(51) Int. Cl.
*G06F 11/08* (2006.01)
*G06F 11/263* (2006.01)
*G06F 16/23* (2019.01)

(52) U.S. Cl.
CPC ........ *G06F 11/263* (2013.01); *G06F 16/2379* (2019.01)

(58) Field of Classification Search
CPC .......................... G06F 11/263; G06F 16/2379
See application file for complete search history.

(56) References Cited

U.S. PATENT DOCUMENTS

| | | | |
|---|---|---|---|
| 11,080,157 B1 * | 8/2021 | Roberts | H04L 41/14 |
| 2019/0392060 A1 * | 12/2019 | Meiri | G06F 11/0751 |
| 2020/0080873 A1 * | 3/2020 | Jackson | G06F 16/2255 |
| 2021/0042214 A1 * | 2/2021 | Kuris | G06F 11/3688 |
| 2022/0058112 A1 * | 2/2022 | Lim | G06F 11/3684 |

* cited by examiner

*Primary Examiner* — Matthew M Kim
*Assistant Examiner* — Kyle Emanuele
(74) *Attorney, Agent, or Firm* — Amin, Turocy & Watson, LLP

(57) ABSTRACT

Architectures and techniques are described that can enhance or improve testing procedure that tests operation of services provided by a data center. Advantageously, the testing dataset can be distributed on test clients allowing the testing procedure to scale to any suitable size, while providing integrity checking for a dataset that includes snapshots and scalability to millions of files, while supporting multiple readers/writers.

20 Claims, 10 Drawing Sheets

EXAMPLE DATA CENTER ENVIRONMENT

DISTRIBUTED DATA STORE FOR TESTING DATA CENTER SERVICES

TECHNICAL FIELD

The present application relates generally to the field of data storage and, more particularly, to utilizing a distributed data store in connection with testing a service of a data center.

BACKGROUND

Today, data centers provide customers various services such as data storage services. Customers expect their data to be secure and available at all times, however, occasionally, errors or fault conditions associated with the data center service can cause problems in that regard.

Hence, operators of data centers are continually testing those services, either existing services or services that are yet to be implemented. Such testing can be used to identify the cause of a fault condition that was previously witnessed in connection with an existing service or identify potential fault conditions in connection with services that are being developed by the data center operator. Unfortunately, existing techniques or systems for testing data center services have significant drawbacks. Accordingly, improvement in this area would be a welcome advance.

BRIEF DESCRIPTION OF THE DRAWINGS

Numerous aspects, embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Figure 1:
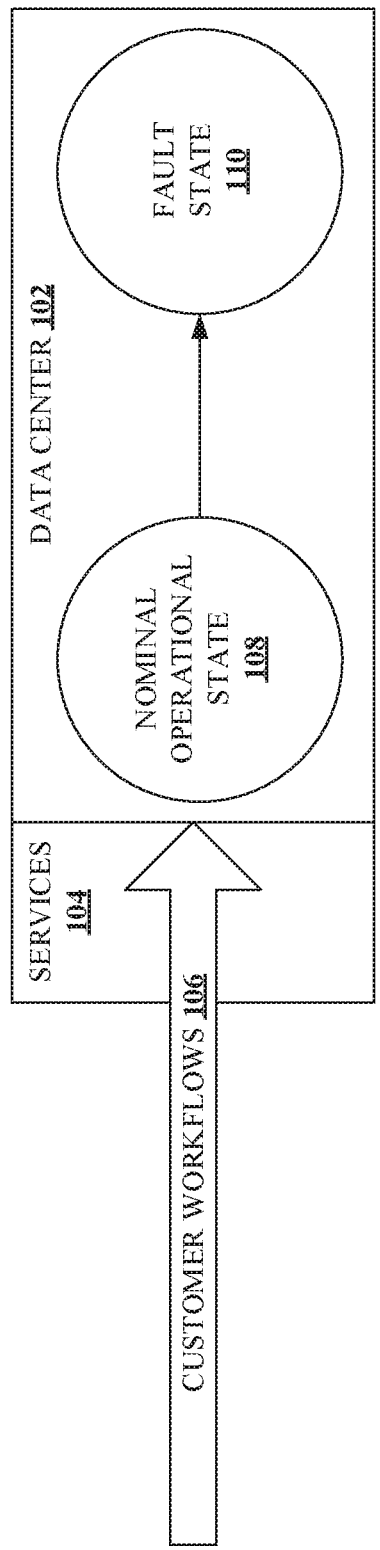
FIG. 1 illustrates a block diagram of an example system illustrating a high-level state diagram of an example data center environment in accordance with certain embodiments of this disclosure.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

FIG. 1 illustrates a block diagram of a system 100. System 100 can represent a high-level state diagram of an example data center environment in accordance with certain embodiments of this disclosure. System 100 can comprise a data center 102 that provides services 104 to customers. In response to customer workflows 106 (e.g., IO operations involving data stored at data center 102), or due to some other reason, data center 102 can transition from nominal operational state 108 to fault state 110.

In the case of fault state 110, an operator, engineers, or technicians are typically very interested in determining a cause of fault state 110, e.g., in order to prevent fault state 110 from occurring in the future or otherwise improving operation of data center 102 and/or associated services 104. One technique for identifying the cause of fault state 110 is to run tests that are designed to test the operation of data center 102 and/or services 104, which is further discussed in connection with FIG. 2. As another example, operators of data center 102 might be interested in testing future services 104 to determine potential faults when implemented.

Figure 2:
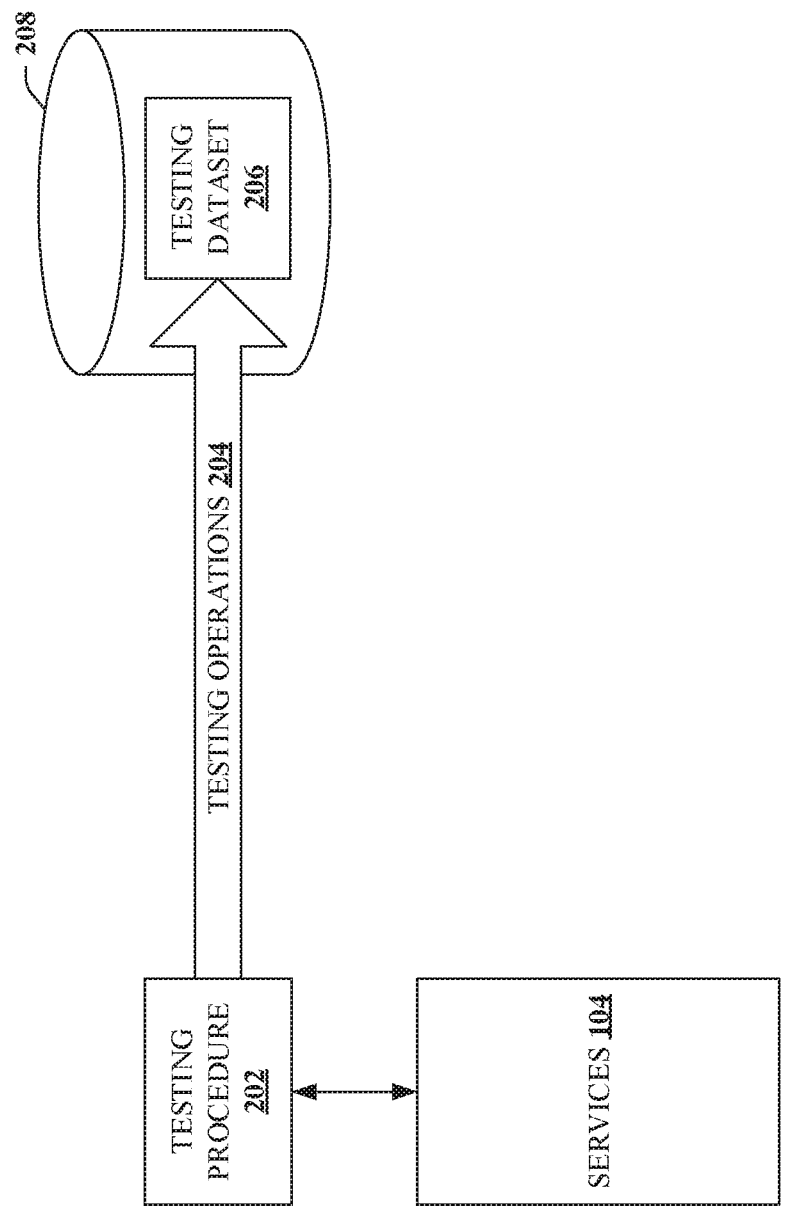
FIG. 2 depicts a block diagram of an example system depicting an example testing environment in accordance with certain embodiments of this disclosure.

FIG. 2 illustrates a block diagram of system 200 depicting an example testing environment in accordance with certain embodiments of this disclosure. As depicted, a testing procedure 202 can implement testing operations 204 on a testing dataset 206. As one example, testing operations 204 can be designed to recreate conditions that are expected to cause fault state 110, or operations that emulate typical customer workflows to detect if a fault state 110 might occur. In this way, testing procedure can be used to determine a cause of some fault condition. As another example, testing operations 204 can be designed to simulate customer workflows (e.g., customer workflows 106) that operate in accordance with services 104.

Due to security, privacy, or other concerns, when performing testing procedure 202, actual customer data is not typically used for testing dataset 206. In fact, it is not strictly necessary that a data store 208 that houses testing dataset 206 be stored on the same devices (e.g., nodes of data center 102 that hold customer data), although many testing techniques do so. Regardless, it can be beneficial for testing dataset 206 to have similar characteristics such as format, file size, etc. as actual customer data. When testing dataset 206 is structured similarly to actual customer data and testing procedure 202 accurately emulates actual customer workflows, testing environment 200 can more closely resemble an actual data center 102 environment, typically resulting in improved testing efficacy.

One difficulty with conventional testing is that many current approaches are extremely simplistic and therefore cannot test complex inner workings and/or accurately simulate actual customer workflows in the context of how services 104 operate in data center 102. Rather, the test might operate only on a single file or might only implement a predetermined sequence of testing operations, then exit. Conventional approaches do not tend to scale well to actual conditions such as, for example, dealing with multiple readers/writers and scaling to millions of files. One reason for this is that a robust testing tool likely must support snapshots (e.g., maintaining different file versions, etc.) and be capable of verifying data integrity, just as is the case with an actual data center environment.

However, in order to support snapshots and integrity checking at scale, a significant amount of storage space is required. For example, the original files must be stored and, depending on the approach, additional storage is needed for self-describing data and "sidecar" or "delta" files that contain a copy of each modification to those files. Since data centers exist to provide storage space, a likely technique is to store testing dataset 206 on clusters or nodes that also store customer data. However, this can lead to additional problems, as if testing procedure 202 runs for any significant length of time and/or if many testing operations 204 increase file sizes, testing data set 206 can grow beyond expectation or beyond available allocated space. Such could potentially affect the performance of data center 102 and/or services 104 that are servicing actual customer demands.

As another example, some issues or fault conditions might only arise when utilization of some resource of data center 102 is near 100%. Attempting to simulate those conditions with a testing procedure, particularly when dataset 206 is located on the same devices used by customers can be problematic or dangerous.

Due to these and other reasons, conventional testing systems tend to suffer from one or several of the following shortcomings. Systems that store testing data on data center clusters require a significant amount of storage and other resources to operate, which can degrade performance for customers or even jeopardize customer data or access. Other systems do not coordinate IO (input/output) operations between multiple readers/writers. Other systems do not support integrity checking across multiple write operations. Other systems are not able to scale to millions of files. Other systems do not provide full file integrity checking. Other systems do not support snapshot data integrity checking. Other systems are unable to reuse testing dataset (e.g., via distill/re-still operations).

In review of conventional testing tools and techniques, none appear to be sufficient to provide integrity checking for a dataset that includes snapshots and scales to millions of files, while supporting multiple readers/writers. Accordingly, providing a testing system with these and other capabilities can advance the technological field of data center service testing. A potential solution to these and other shortcomings can now be described with reference to FIG. 3 and subsequent drawings.

For example, the disclosed subject matter is directed to an improved system for testing for data center services. Advantageously, testing dataset 206 can be stored on a group of testing clients as opposed to being stored on the nodes/clusters of data center 102 that customers access in connection with services 104. Hence, testing can run in parallel with actual customer workflows which can mitigate potential negative effects on data center 102 performance or customer experiences.

In some embodiments, dataset 206 can be implemented as a fault-tolerant, distributed database that spans selected test clients. Thus, testing procedure 202 can scale to any suitable size or complexity, e.g., by simply allocating additional test clients or changing an amount of allocated capacity or some other resource of individual test clients. Thus, because dataset 206 resides on test clients, testing procedure 202 can have much greater control over storage allocation without other constraints. In some embodiments, dataset 206 can be stored in volatile memory, which can yield certain performance advantages.

In some embodiments, the system can comprise an orchestrator, also referred to as an orchestrator component, that can coordinate all activities on cluster nodes and test clients. For example, the orchestrator component can coordinate IO transactions between multiple readers/writers. The orchestrator component can be responsible for configuring clusters of the data center, managing jobs, dispatching work to remote clients, creating and maintaining the distributed database, recording all operations, and so forth. The orchestrator component can store all operation data, including snapshot data, IO operations, resulting hash values, timestamps, and so on, which is collectively referred to herein as testing dataset 206 and/or is otherwise stored in the distributed database of the test clients.

As introduced above, using a distributed and fault-tolerant in-memory database that is distributed across many test clients can allow the system to easily scale by increasing the number of clients or by increasing the memory allocation of each client. Further, the use of an in-memory distributed database can provide a significant performance advantage over an on-disk solution. Further, by using testing clients to hold the database as opposed to the cluster nodes, such can prevent deleterious impacts on the performance of the system under test.

Example Systems

Figure 3:
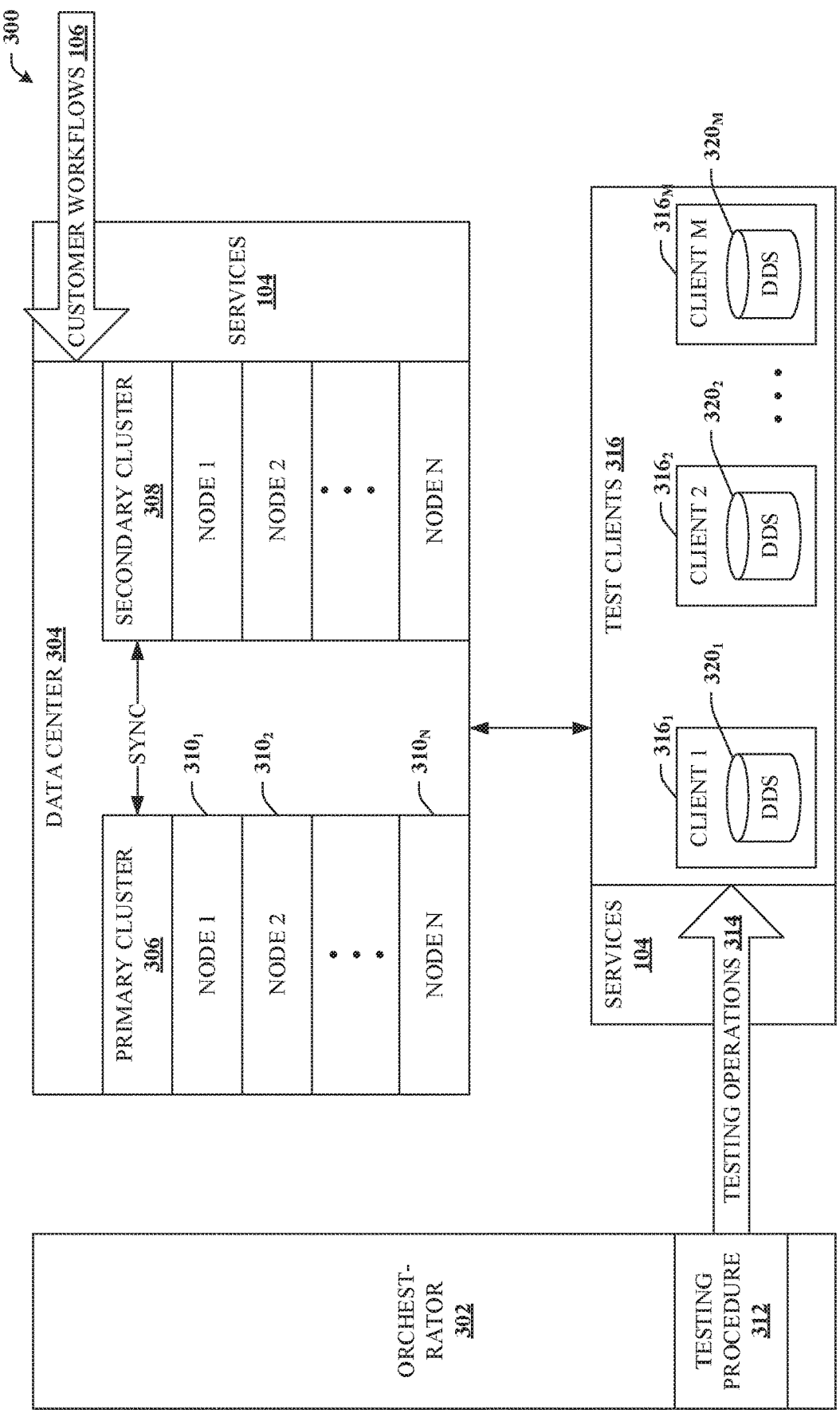
FIG. 3 depicts a block diagram of an example system that can be configured to control a testing procedure that tests operation of a service provided by a data center comprising storage nodes in accordance with certain embodiments of this disclosure.

Referring now to FIG. 3, a block diagram of an example system 300. System 300 can be configured to control a testing procedure that tests operation of a service provided by a data center comprising storage nodes in accordance with certain embodiments of this disclosure. Control of the testing procedure can be accomplished by orchestrator 302. Generally, orchestrator 302 (and other systems, components, or devices detailed herein) can comprise a processor and a memory that stores executable instructions that, when executed by the processor, facilitate performance of operations. Examples of the memory and processor can be found with reference to FIG. 10. It is to be appreciated that the computer 1002 can represent a server device or a client device and can be used in connection with implementing one or more of the systems, devices, or components shown and described in connection with FIG. 3 and other figures disclosed herein.

System 300 can further comprise data center 304 that can provide services 104 to customers. For example, data center 304 can receive operations or instructions in the form of customer workflows 106. Data center 304 can comprise primary cluster 306 (e.g., R1) and secondary cluster 308 (e.g., R2), which can house copies of customer data. For example, primary cluster 306 can comprise nodes (e.g., storage nodes) 310$_1$-310$_N$, where N can be substantially any positive integer. To give an idea of the potential scale that is possible, the disclosed subject matter has been tested with over 300 nodes and supports multiple clusters (e.g., when testing with synchronization services), but is believed to be capable of even further scaling. Likewise, secondary cluster 308 can comprise N similar storage nodes, which can represent a backup of data stored at primary cluster 306. It is understood that nodes $310_1$-$310_N$ can be referred to herein, either collectively or individually as node(s) 310, with appropriate subscripts employed generally only when necessary or convenient to highlight various distinctions or to better impart the disclosed concepts. It is appreciated that synchronization operations can be employed to sync data between primary cluster 306 and secondary cluster 308 as well as between cloud storage systems (not shown) or the like.

As noted, orchestrator 302 can be configured to control a testing procedure 312 that tests operation of a service 104 provided by data center 304 by application of testing operations 314. In other words, data center 304 and associated storage nodes (e.g., nodes 310) can represent the system under test. Testing datasets, however, can be located elsewhere, such as in test clients 316, namely in distributed data store (DDS) 320. In some embodiments, the testing datasets can have a similar structure to actual client data stored in nodes 310. Thus, testing datasets can effectively emulate actual customer data, which can be stored in a fault-tolerant distributed manner that effectively emulates storage nodes 310 of data center 304, and testing operations 314 can effectively emulate actual customer workflows 106. Based on these architectures and techniques, the disclosed system can be capable of integrity checking on datasets that include snapshots and can scale to any suitable size, while supporting multiple readers/writers.

In operation, system 300 and/or orchestrator 302 can determine or identify a group of storage nodes (e.g., nodes 310) of data center 304 as being representative of a primary cluster (e.g., primary cluster 306) of nodes of data center 304. Based on characteristics of the group of storage nodes, orchestrator 302 can determine a group of test clients 316 that are to store the testing dataset for testing procedure 312. For example, allocation of clients 316 and/or memory thereof can be scaled to the needs of testing procedure 312 and/or the characteristics of nodes 310. Thus, DDS 320 can be distributed in a fault-tolerant manner and can be scaled by increasing the number of test clients 316 or the amount of memory per client. The disclosed subject matter has been implemented at scale, being used to test millions of operations per file and a dataset containing millions of files, but even larger scales are envisioned. Snapshot data and locking operation states can also be stored to DDS 320. In some embodiments, two full replicas of every key space can be stored and the arrangement can withstand a loss of up to 50% of the hosts.

Orchestrator 302 can further configure the group of test clients 316 to maintain a fault-tolerant DDS 320. For example, separate portions of the testing data can be stored to different ones of DDS $320_1$-$320_M$ to allow faults or loss of availability of some test clients 316 to be handled. In some embodiments, DDS 320 can be distributed among RAM or volatile memory. The fault-tolerant DDS 320 can be configured to record testing data generated during application of testing procedure 312.

It is appreciated that testing data can include all or a portion of various types of data, including snapshot information, operation data, history, etc. in that regard, in addition to the original data being tested, for every IO operation performed on a file, a number of forensic information can be captured, which can also be included in DDS 320. Such data can include, for instance, full file path, LIN::SNAP, type of operation, size of operation, offset, data pattern, starting timestamp, time required to complete the operation, SmartLink state, post-operation hash value to name a few. With this and other suitable data, orchestrator 302 (and/or system 300) can track and verify the integrity of any file or snapshot that is part of the dataset. Such can also enable a wide range of dynamic elements with regard to testing. For example, testing procedure 312 can be paused during operation and resumed, potentially while modifying parameters of testing procedure 312. Further, since all updates to a file or snapshot are tracked, a replay ability can be invoked that can replay all operations that led to a file's current state can be observed, which can greatly aid dissecting faults and/or associated causes. Having a complete and accurate history for every file has been demonstrated to be useful when troubleshooting faults such as faults relating to data unavailable (DU) errors or data lost (DL) errors.

It is further appreciated that by distributing DDS 320 on test clients 316, resources devoted to data center clusters need not be consumed by testing procedure 312. Moreover, in some embodiments, testing procedure 312 can model customer workflows 106 at a scale similar to actual conditions witnessed by data center 304. Hence, fault testing can be realized in more realistic environments than more simplistic models or techniques. Further, testing procedure 312 can test many different interoperable services in a substantially real-world environment that can run continuously for significant periods of time (e.g., days, weeks, or even months or more).

Figure 4:
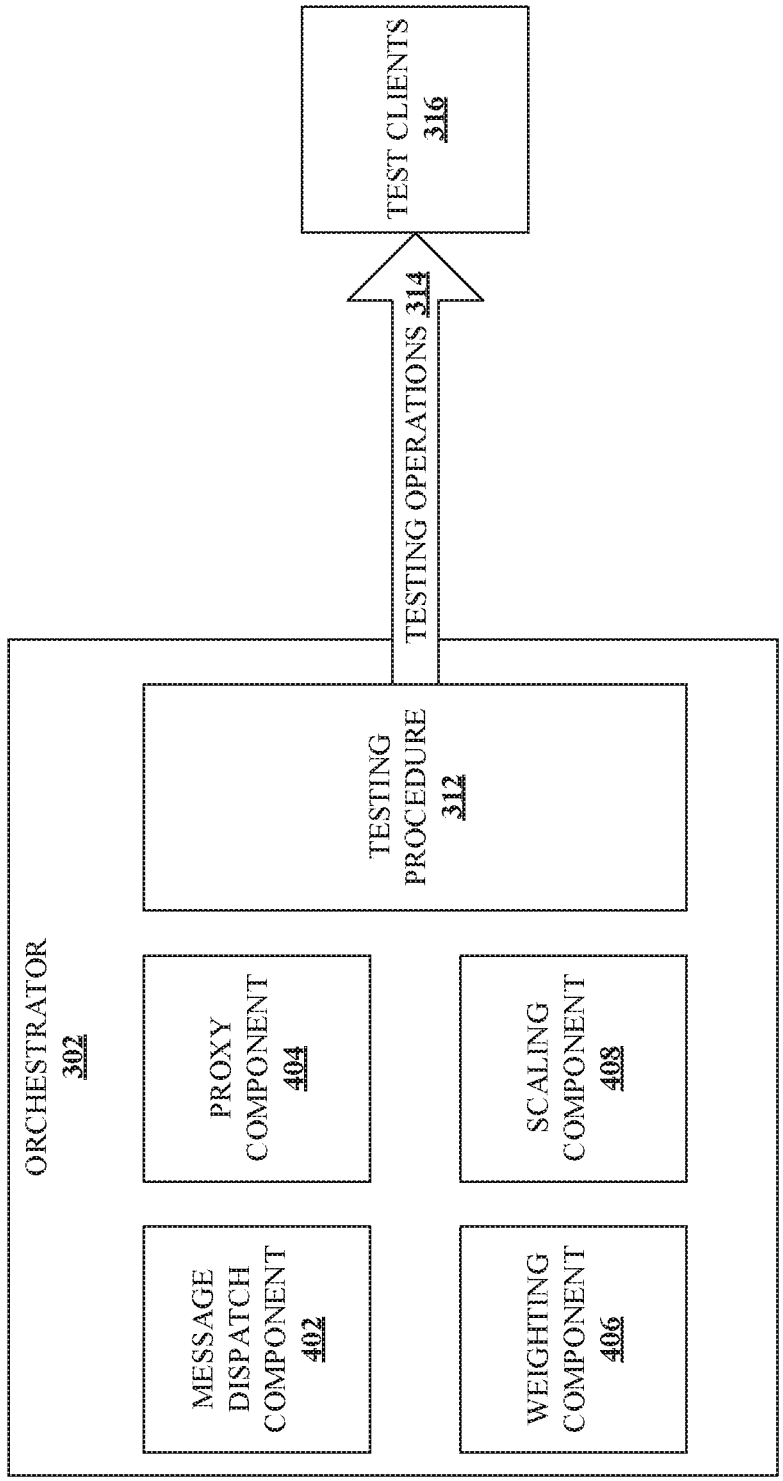
FIG. 4 illustrates a block diagram of an example system illustrating additional or more detailed view of the orchestrator component in accordance with certain embodiments of this disclosure.

With reference now to FIG. 4, block diagram 400 is depicted. Diagram 400 illustrates additional or more detailed view of orchestrator component 302 in accordance with certain embodiments of this disclosure. As previously explained, orchestrator 302 can be responsible for coordinating operations in the testing environment and can be run on a dedicated virtual or physical host Orchestrator 302 can further manage testing procedure 312, jobs run by services 104, test clients 316, snapshots, and database operations that are managed by the host. Orchestrator 302 can also be responsible for starting dashboards (e.g., a web UI) to help visualize results of testing procedure 312 and enable input via, e.g., outside commands such as the pause, resume, replay functions introduced above as well as others detailed herein.

Additional components (e.g., components 402-408), now described, can be included in whole or in part in orchestrator 302 as depicted. In some embodiments, all or a portion of the additional components can be situated remotely and operatively or communicatively coupled to orchestrator 302. For example, orchestrator 302 can comprise message dispatch component 402 that can be configured to change a flow of testing procedure 312 during operation of testing procedure 312. Most conventional testing systems perform only a set of statically defined steps/operations, then exit, or exit prior to completion in the event of a fault. In the event of a problem or fault, the system reports the error and terminates, requiring the process to be restarted if further tests are to be performed. In contrast, the disclosed subject matter can dynamically change testing procedure 312 while running and/or inject new testing operations 314 that are not predefined while running, which can allow on-the-fly changes to a test flow.

Message dispatch component 402 can further be employed to enable a pause function, a resume function, a quit event function, and so forth. For instance, in the event an error is detected during testing procedure 312, error details can be displayed and testing procedure 312 paused, potentially automatically, while the error details are reviewed during troubleshooting. In some embodiments, all or a portion of orchestrator processes can be paused as well as all or a portion of IO operations of test clients 316, all or a portion of daemons under test, storage jobs, and synchronization policies. In other words, pausing all activity that may change the state of the dataset can be effectuated. Such can dramatically improve the chances of accurately analyzing the data while still in the error state.

Once data collection and/or troubleshooting has been completed, the resume function can be activated to continue testing from the point in testing procedure 312 where the pause function was activated. For testing procedures that take multiple days, weeks, or longer, such be a significant advantage in prevention of lost time, since the test does not need to start over, even after potential troubleshooting that may change testing procedure 312. Further, message dispatch component 402 can facilitate the ability to take snapshots of the dataset manually while still coordinating the event using orchestrator 302. During longevity testing, it can be desirable to run testing procedure 312 for an undetermined period of time before moving on to the next step in the process. Message dispatch component 402 can be used to allow testing client 316 IO to run until the user decides to stop IO and move to the next step in the process.

Orchestrator component 302 can further comprise proxy component 404 that can facilitate managing local access to remote objects. For example, proxy component 404 can represent a collection of server, client, connection manager, client manager, and other devices that can provide transparent proxy service for Python objects or other suitable objects. These services can be built on top of any suitable tool, including third-party tools such as remote Python call (RPyC), and can provide local access to remote Python objects. Proxy component 404 can be instrumental in testing in general and can enable orchestrator 302 to efficiently manage large numbers of cluster nodes 310 and test clients 316.

In some embodiments, proxy component 316 can further provide the ability to maintain and reuse connections in a threaded environment. In some embodiments, proxy component 316 can function to provide the ability for connections to be self-validated and, if suitable, rebuild connections dynamically before returning to a cached connection. Such can significantly improve user experiences by making the remote nature of these connections more resilient to network issues.

Orchestrator component 302 can further comprise weighting component 406 that can be configured to adjust a preference for a type of IO operation based on a defined storage utilization target. For example, consider the case where certain issues only arise when the system under test is running near 100% capacity. Attempting to test near the 100% capacity limit using previous systems was very risky as those previous systems only worked against a given number of files or operations. Allowing storage utilization to drop too low would not reproduce the issue, yet running at very high utilization could put the cluster in a non-recoverable state, forcing the system to be reimaged and the test restarted.

Advantageously, weighting component 406 can be configured to dynamically adjust the types of operations (e.g., testing operations 314) being performed based on current capacity relative to a desired capacity. For example, actions or operations can be assigned a weight that can be adjusted in real time to favor operations that, e.g., either reduce storage utilization (e.g., truncate down operations, delete operations, snapdelete operations, etc.) or increase storage utilization (e.g., write operations, append operations, truncate up operations, snapshot operations, etc.). Once storage load is at the desired target and/or within a desired range (e.g., above a low threshold target and below a high threshold target), the weights can be returned to default or nominal values. It is appreciated that updates provided by weighting component 406 can be extremely useful as a safeguard during very long runtime tests that are not being actively monitored. By adjusting weights, such can prevent "disk full" scenarios that can occur, e.g., over a long weekend or holiday.

Orchestrator 302 can further comprise scaling component 408 that can be configured to manage the DDS 320 of the group of test clients 316 in a fault-tolerant manner and to monitor health of the group of test clients. It is appreciated that one significant shortcoming with other testing systems relates to resource limitations. In many other systems, the size of the data set under test was limited by the memory or storage available on the host upon which the test was being run. Scaling the dataset meant attempting to create a single host with more and more memory or storage.

In contrast, DDS 320 can be situated on test clients 316 rather than the host. Further, by "sharding" the transactions and HASH data (e.g., a fingerprint or record of all or a portion of the transactions implemented) and by distributing that data across a scalable number of test clients 316, the test environment can be readily scaled to sizes that accurately mimic customer environments. To provide additional system resiliency, every "shard" is replicated to one or more other hosts. Such can allow a potentially large number of clients to fail before significantly impacting the system. Due to this architecture, scaling component 408 can further manage rolling power cycle (e.g., reboot or restart) of clients 316 during the test without stopping the test. In addition, by monitoring the health of test clients 316, scaling component 408 can further identify whether a particular test client 316 is suitable for testing at any given time. Test clients 316 deemed unsuitable can be skipped and flagged for restart or other analysis, and brought online with testing procedure 312 when the health condition meets the testing criteria.

Figure 5:
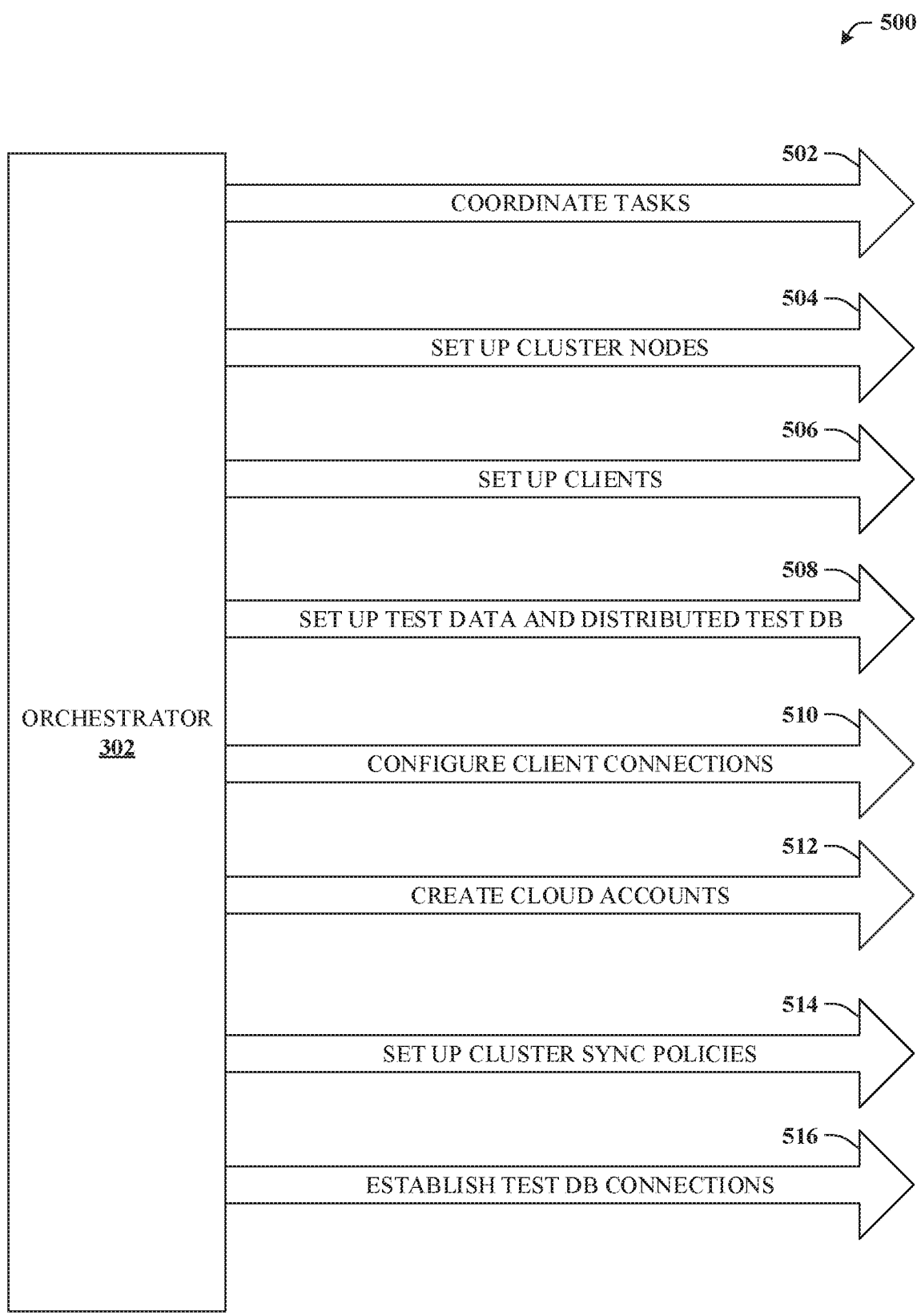
FIG. 5 illustrates a block diagram of an example system illustrating a summary of responsibilities or workflows of the orchestrator component during implementation of a testing procedure in accordance with certain embodiments of this disclosure.

Turning now to FIG. 5, system 500 is depicted. System 500 illustrates summary of responsibilities or workflows of orchestrator component 302 during implementation of a testing procedure in accordance with certain embodiments of this disclosure. For example, at a high level, orchestrator component 302 can be responsible for coordinating all or a portion of tasks or jobs associated with testing procedure 312, which is illustrated by reference numeral 502. At reference numeral 504, orchestrator component 302 can set up cluster nodes 504 that can be representative of, e.g., primary cluster 306.

At reference numeral 506, orchestrator component 302 can set up test clients such as test clients 316. Such can be based on characteristics of the cluster nodes set up at reference numeral 504. At reference numeral 508, orchestrator component 302 can set up test data and distributed test databases. For instance, orchestrator component 302 can structure DDS 320 and the initial data thereof.

At reference numeral 510, orchestrator component 302 can configure test client connections such as all or a portion of connections to test clients 316. At reference numeral 512, orchestrator component 302 can create cloud accounts in suitable embodiments. At reference numeral 514, orchestrator component 302 can set up cluster sync policies, which can be representative of synchronization activity between primary and secondary clusters and/or cloud-based nodes or clusters. At reference numeral 516, orchestrator component 516 can establish test database connections and/or manage all communication with the test database(s) (e.g., DDS 320).

Figure 6:
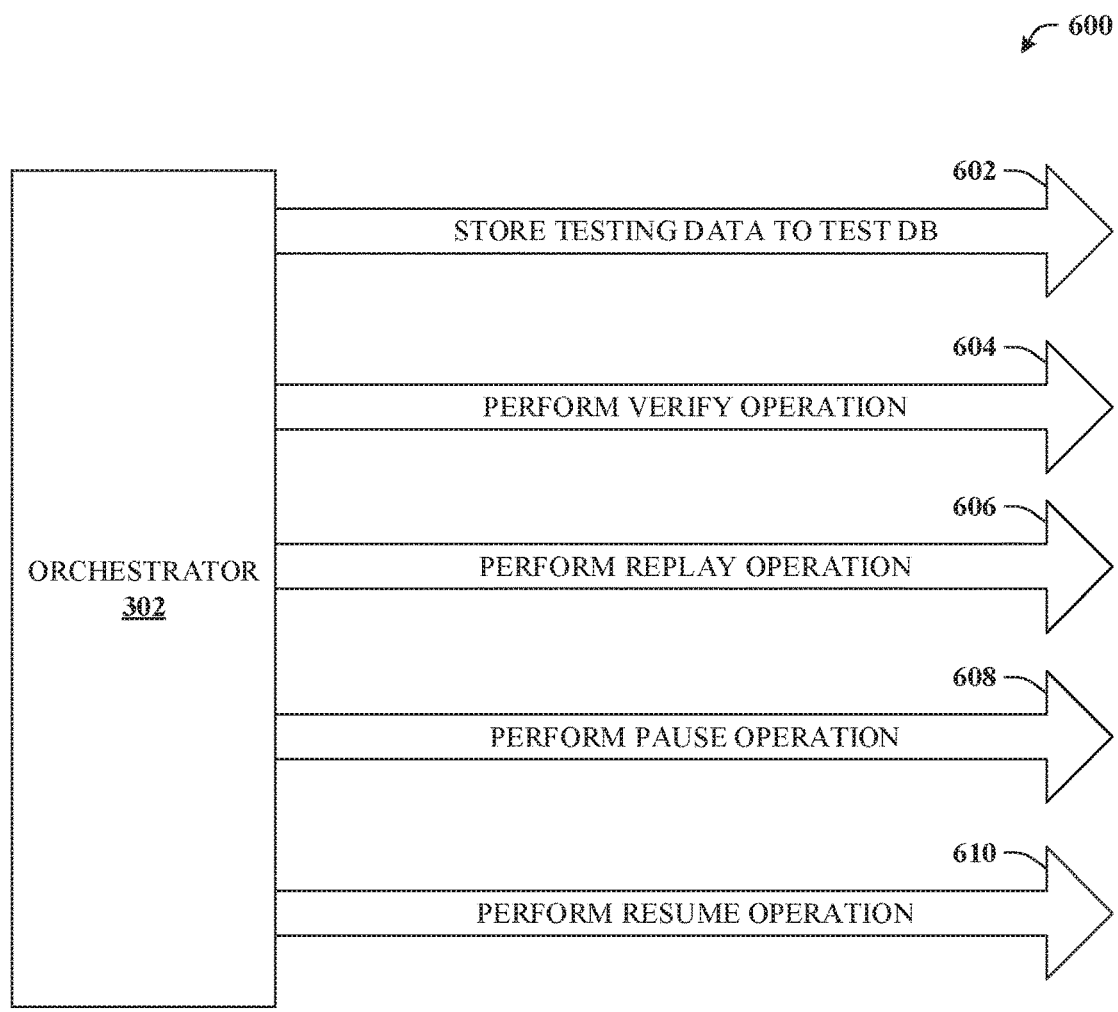
FIG. 6 depicts a block diagram of an example system illustrating additional aspects or elements of the orchestrator component in accordance with certain embodiments of this disclosure.

Turning now to FIG. 6, system 600 is depicted. System 600 illustrates additional aspects or elements of orchestrator component 302 in accordance with certain embodiments of this disclosure. In some embodiments, orchestrator component 302 can store testing data to DDS 320 located on test clients 316, which is illustrated by reference numeral 604. Such testing data can represent original datasets as well as monitoring or tracking data resulting from testing operations 314. For example, the testing data can comprise at least one of: snapshot data representative of a state of a test file at a defined time, timestamp data representative of a time, IO log data representative of an IO transaction applied to the file, an IO fingerprint representative of a hash of the IO transaction, and so forth.

In some embodiments, orchestrator component 302 can perform a verify operation, as illustrated at reference numeral 604. This verify operation can verify integrity of the file based on a comparison with the IO fingerprint. The fingerprint can be based on a hash function and appropriate hash functions can be generated and stored for all IO transactions. As one result of the meticulous fingerprint or hash function tracking, orchestrator component 302 can perform a replay operation as denoted by reference numeral 606. The replay operation can, e.g., based on a sequence of IO fingerprints, illustrate how the file changed to the current state. In some embodiments, the replay operation can physically reconstruct a file from an original state to a present state from the sequence of IO fingerprints. Such can be especially beneficial in troubleshooting potential errors or faults.

As illustrated by reference numerals 608 and 610, orchestrator component 302 can be respectively configured to perform a pause operation and a resume operation. The pause operation can be configured to pause an application of testing procedure 312, resulting in a paused state. The resume operation can be configured to resume the application of testing procedure 312 from the paused state. It is appreciated that while in the paused state, other operations can be executed, like, for instance, the replay operation, which can aid in troubleshooting endeavors. As another example, an update operation can be performed that updates a parameter of testing procedure 312. Thereafter, upon execution of the resume operation, testing procedure 312 can proceed in accordance with the updated parameter.

Example Methods

Figure 7:
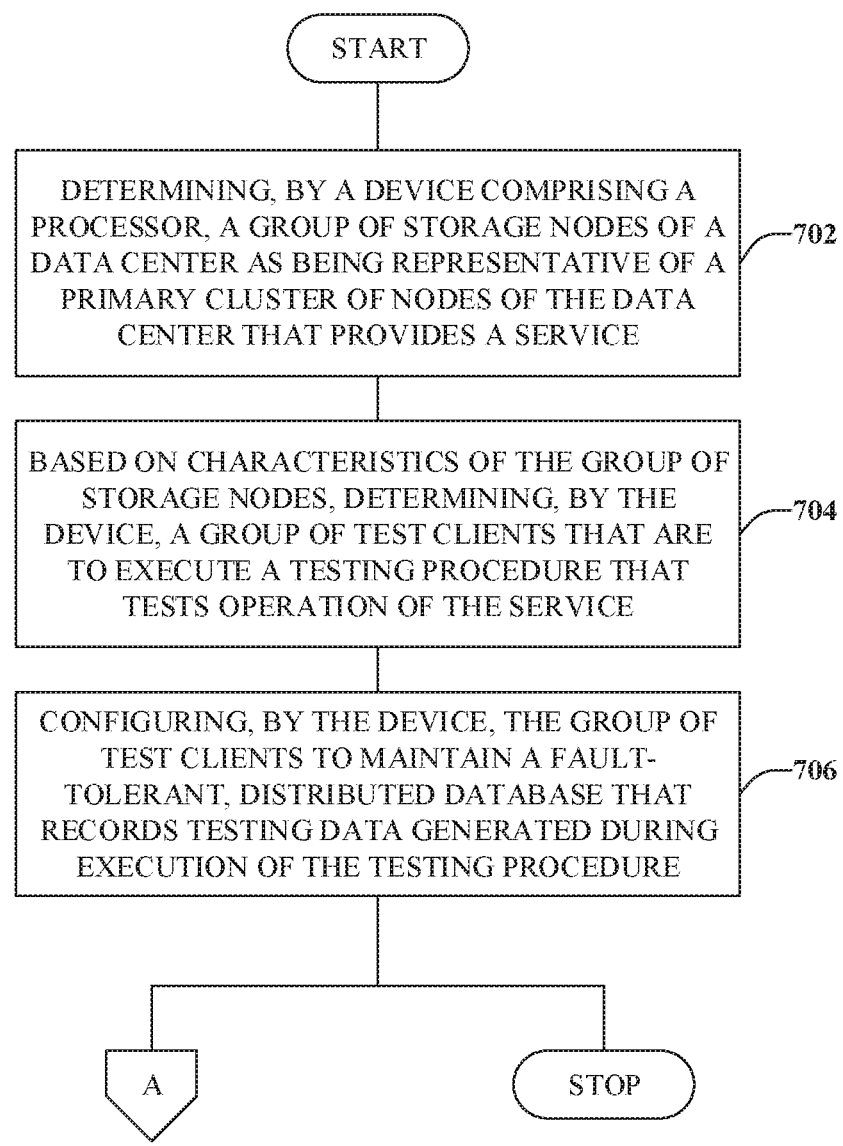
FIG. 7 illustrates an example methodology that can manage a testing procedure that tests operation of a service provided by a data center comprising storage nodes in accordance with certain embodiments of this disclosure.
Figure 8:
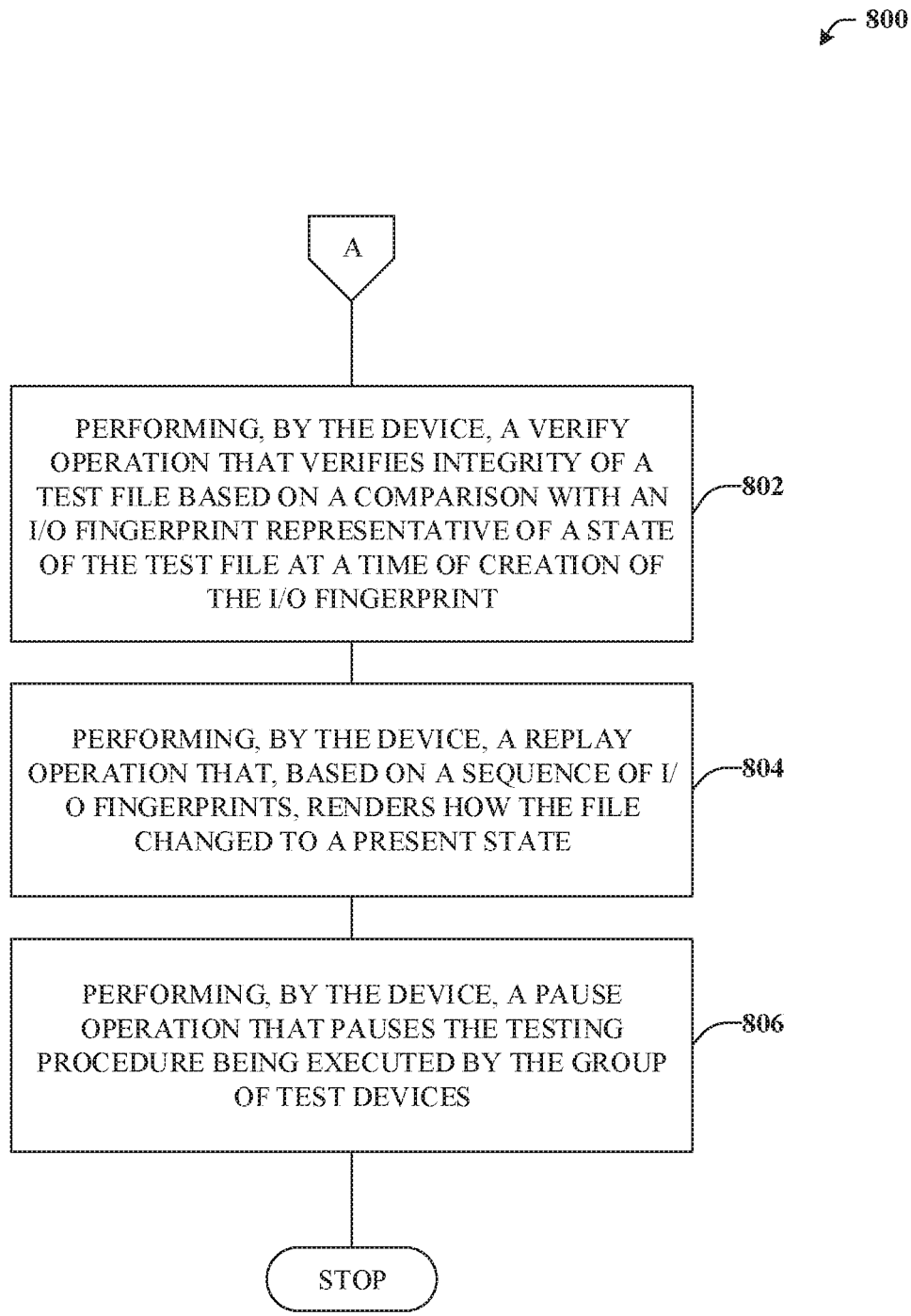
FIG. 8 illustrates an example methodology that can provide for additional aspect or elements in connection with the testing procedure that tests operation of a service provided by a data center comprising storage nodes in accordance with certain embodiments of this disclosure.

FIGS. 7 and 8 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

Referring now to FIG. 7, exemplary method 700 is depicted. Method 700 can manage a testing procedure that tests operation of a service provided by a data center comprising storage nodes in accordance with certain embodiments of this disclosure. While method 700 describes a complete methodology, in some embodiments, method 700 can include one or more elements of method 800, as illustrated by insert A.

At reference numeral 702, a device comprising a processor can determine a group of storage nodes of a data center as being representative of a primary cluster of nodes of the data center that provides a service. At reference numeral 704, the device can, based on characteristics of the group of storage nodes, determine a group of test clients that are to store testing data and test operation of the service.

At reference numeral 706, the device can configure the group of test clients to maintain a fault-tolerant, distributed database that records testing data generated during execution of a testing procedure. For example, the data center can comprise a primary storage cluster that comprises multiple nodes and a secondary storage cluster comprising a like number of nodes. The fault-tolerant, distributed database of the test clients can substantially mimic the structure and characteristics of the data center that stores actual customer data. Method 700 can terminate or continue to insert A, which is further detailed in connection with FIG. 8.

Turning now to FIG. 8, exemplary method 800 is depicted. Method 800 can provide for additional aspect or elements in connection with the testing procedure that tests operation of a service provided by a data center comprising storage nodes in accordance with certain embodiments of this disclosure.

At reference numeral 802, the device introduced at reference numeral 702 comprising a processor can perform a verify operation. The verify operation can be configured to verify integrity of a test file based on a comparison with an IO fingerprint. The IO fingerprint can be representative of a state of the test file at a time of creation of the IO fingerprint.

At reference numeral 804, the device can perform a replay operation. The replay operation can be based on a sequence of IO fingerprints. As a result, the replay operation can render an illustration of how the file changed to a present state. Such can be a visual representation or can be based on a physical reconstruction of the file from the IO fingerprint history.

At reference numeral 806, the device can perform a pause operation. The pause operation can be configured to pause the testing procedure being executed by the group of test devices. While in a paused state, diagnostics to the testing data and/or updates to the testing procedure can be implemented. Thereafter, in some embodiments, the testing procedure can be resumed from the paused state, e.g., via a resume operation.

Example Operating Environments

Figure 9:
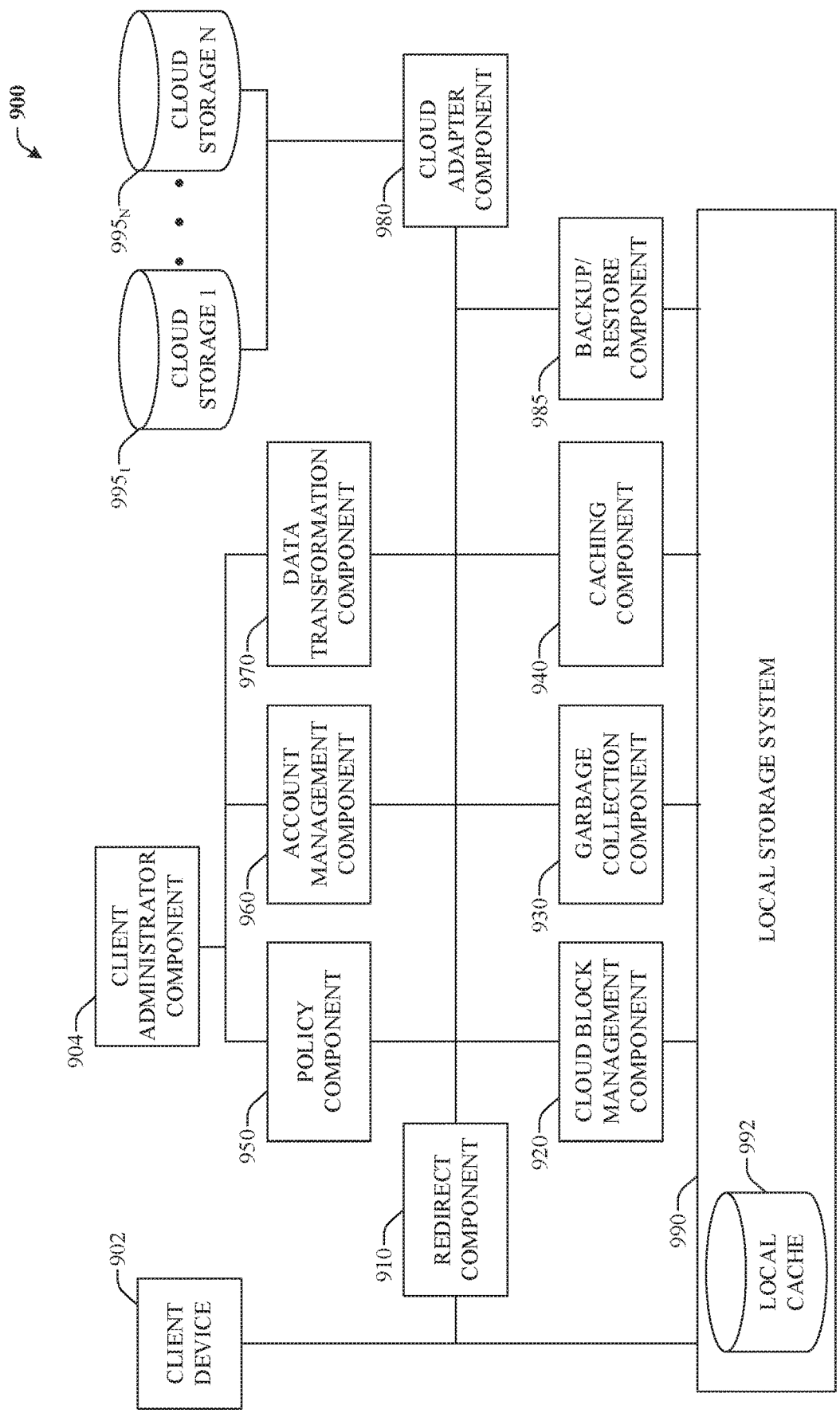
FIG. 9 illustrates a block diagram of an example distributed file storage system that employs tiered cloud storage in accordance with certain embodiments of this disclosure.
Figure 10:
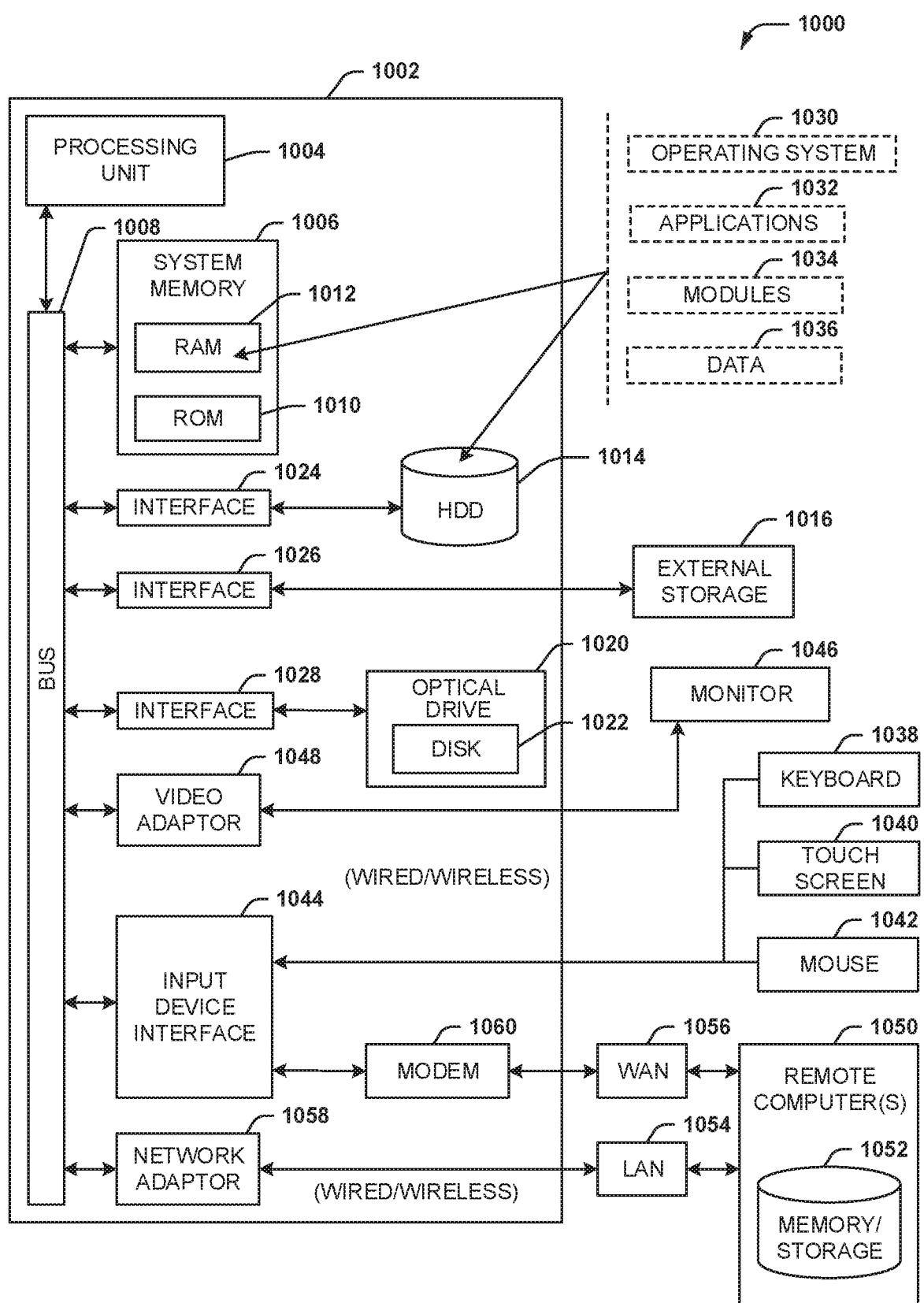
FIG. 10 illustrates an example block diagram of a computer operable to execute certain embodiments of this disclosure.

To provide further context for various aspects of the subject specification, FIGS. 9 and 10 illustrate, respectively, a block diagram of an example distributed file storage system 900 that employs tiered cloud storage and block diagram of a computer 1002 operable to execute the disclosed storage architecture in accordance with aspects described herein.

Referring now to FIG. 9, there is illustrated an example local storage system including cloud tiering components and a cloud storage location in accordance with implementations of this disclosure. Client device 902 can access local storage system 990. Local storage system 990 can be a node and cluster storage system such as an EMC Isilon Cluster that operates under OneFS operating system. Local storage system 990 can also store the local cache 992 for access by other components. It can be appreciated that the systems and methods described herein can run in tandem with other local storage systems as well.

As more fully described below with respect to redirect component 910, redirect component 910 can intercept operations directed to stub files. Cloud block management component 920, garbage collection component 930, and caching component 940 may also be in communication with local storage system 990 directly as depicted in FIG. 9 or through redirect component 910. A client administrator component 904 may use an interface to access the policy component 950 and the account management component 960 for operations as more fully described below with respect to these components. Data transformation component 970 can operate to provide encryption and compression to files tiered to cloud storage. Cloud adapter component 980 can be in communication with cloud storage 1 and cloud storage N, where N is a positive integer. It can be appreciated that multiple cloud storage locations can be used for storage including multiple accounts within a single cloud storage location as more fully described in implementations of this disclosure. Further, a backup/restore component 997 can be utilized to back up the files stored within the local storage system 990.

Cloud block management component 920 manages the mapping between stub files and cloud objects, the allocation of cloud objects for stubbing, and locating cloud objects for recall and/or reads and writes. It can be appreciated that as file content data is moved to cloud storage, metadata relating to the file, for example, the complete Mode and extended attributes of the file, still are stored locally, as a stub. In one implementation, metadata relating to the file can also be stored in cloud storage for use, for example, in a disaster recovery scenario.

Mapping between a stub file and a set of cloud objects models the link between a local file (e.g., a file location, offset, range, etc.) and a set of cloud objects where individual cloud objects can be defined by at least an account, a container, and an object identifier. The mapping information (e.g., mapinfo) can be stored as an extended attribute directly in the file. It can be appreciated that in some operating system environments, the extended attribute field can have size limitations. For example, in one implementation, the extended attribute for a file is 8 kilobytes. In one implementation, when the mapping information grows larger than the extended attribute field provides, overflow mapping information can be stored in a separate system b-tree. For example, when a stub file is modified in different parts of the file, and the changes are written back in different times, the mapping associated with the file may grow. It can be appreciated that having to reference a set of non-sequential cloud objects that have individual mapping information rather than referencing a set of sequential cloud objects, can increase the size of the mapping information stored. In one implementation, the use of the overflow system b-tree can limit the use of the overflow to large stub files that are modified in different regions of the file.

File content can be mapped by the cloud block management component 920 in chunks of data. A uniform chunk size can be selected where all files that tiered to cloud storage can be broken down into chunks and stored as individual cloud objects per chunk. It can be appreciated that a large chunk size can reduce the number of objects used to represent a file in cloud storage; however, a large chunk size can decrease the performance of random writes.

The account management component 960 manages the information for cloud storage accounts. Account information can be populated manually via a user interface provided to a user or administer of the system. Each account can be associated with account details such as an account name, a cloud storage provider, a uniform resource locator ("URL"), an access key, a creation date, statistics associated with usage of the account, an account capacity, and an amount of available capacity. Statistics associated with usage of the account can be updated by the cloud block management component 920 based on list of mappings it manages. For example, each stub can be associated with an account, and the cloud block management component 920 can aggregate information from a set of stubs associated with the same account. Other example statistics that can be maintained include the number of recalls, the number of writes, the number of modifications, and the largest recall by read and write operations, etc. In one implementation, multiple accounts can exist for a single cloud service provider, each with unique account names and access codes.

The cloud adapter component 980 manages the sending and receiving of data to and from the cloud service providers. The cloud adapter component 980 can utilize a set of APIs. For example, each cloud service provider may have provider specific API to interact with the provider.

A policy component 950 enables a set of policies that aid a user of the system to identify files eligible for being tiered to cloud storage. A policy can use criteria such as file name, file path, file size, file attributes including user generated file attributes, last modified time, last access time, last status change, and file ownership. It can be appreciated that other file attributes not given as examples can be used to establish tiering policies, including custom attributes specifically designed for such purpose. In one implementation, a policy can be established based on a file being greater than a file size threshold and the last access time being greater than a time threshold.

In one implementation, a policy can specify the following criteria: stubbing criteria, cloud account priorities, encryption options, compression options, caching and IO access pattern recognition, and retention settings. For example, user selected retention policies can be honored by garbage collection component 930. In another example, caching policies such as those that direct the amount of data cached for a stub (e.g., full vs. partial cache), a cache expiration period (e.g., a time period where after expiration, data in the cache is no longer valid), a write back settle time (e.g., a time period of delay for further operations on a cache region to guarantee any previous writebacks to cloud storage have settled prior to modifying data in the local cache), a delayed invalidation period (e.g., a time period specifying a delay until a cached region is invalidated thus retaining data for backup or emergency retention), a garbage collection retention period, backup retention periods including short term and long term retention periods, etc.

A garbage collection component 930 can be used to determine which files/objects/data constructs remaining in both local storage and cloud storage can be deleted. In one implementation, the resources to be managed for garbage collection include CMOs, cloud data objects (CDOs) (e.g., a cloud object containing the actual tiered content data), local cache data, and cache state information.

A caching component 940 can be used to facilitate efficient caching of data to help reduce the bandwidth cost of repeated reads and writes to the same portion (e.g., chunk or sub-chunk) of a stubbed file, can increase the performance of the write operation, and can increase performance of read operations to portion of a stubbed file accessed repeatedly. As stated above with regards to the cloud block management component 920, files that are tiered are split into chunks and in some implementations, sub chunks. Thus, a stub file or a secondary data structure can be maintained to store states of each chunk or sub-chunk of a stubbed file. States (e.g., stored in the stub as cacheinfo) can include a cached data state meaning that an exact copy of the data in cloud storage is stored in local cache storage, a non-cached state meaning that the data for a chunk or over a range of chunks and/or sub chunks is not cached and therefore the data has to be obtained from the cloud storage provider, a modified state or dirty state meaning that the data in the range has been modified, but the modified data has not yet been synched to cloud storage, a sync-in-progress state that indicates that the dirty data within the cache is in the process of being synced back to the cloud and a truncated state meaning that the data in the range has been explicitly truncated by a user. In one implementation, a fully cached state can be flagged in the stub associated with the file signifying that all data associated with the stub is present in local storage. This flag can occur outside the cache tracking tree in the stub file (e.g., stored in the stub file as cacheinfo), and can allow, in one example, reads to be directly served locally without looking to the cache tracking tree.

The caching component 940 can be used to perform at least the following seven operations: cache initialization, cache destruction, removing cached data, adding existing file information to the cache, adding new file information to the cache, reading information from the cache, updating existing file information to the cache, and truncating the cache due to a file operation. It can be appreciated that besides the initialization and destruction of the cache, the remaining five operations can be represented by four basic file system operations: Fill, Write, Clear and Sync. For example, removing cached data is represented by clear, adding existing file information to the cache by fill, adding new information to the cache by write, reading information from the cache by read following a fill, updating existing file information to the cache by fill followed by a write, and truncating cache due to file operation by sync and then a partial clear.

In one implementation, the caching component 940 can track any operations performed on the cache. For example, any operation touching the cache can be added to a queue prior to the corresponding operation being performed on the cache. For example, before a fill operation, an entry is placed on an invalidate queue as the file and/or regions of the file will be transitioning from an uncached state to cached state. In another example, before a write operation, an entry is placed on a synchronization list as the file and/or regions of the file will be transitioning from cached to cached-dirty. A flag can be associated with the file and/or regions of the file to show that it has been placed in a queue and the flag can be cleared upon successfully completing the queue process.

In one implementation, a time stamp can be utilized for an operation along with a custom settle time depending on the operations. The settle time can instruct the system how long to wait before allowing a second operation on a file and/or file region. For example, if the file is written to cache and a write back entry is also received, by using settle times, the write back can be re-queued rather than processed if the operation is attempted to be performed prior to the expiration of the settle time.

In one implementation, a cache tracking file can be generated and associated with a stub file at the time it is tiered to the cloud. The cache tracking file can track locks on the entire file and/or regions of the file and the cache state of regions of the file. In one implementation, the cache tracking file is stored in an Alternate Data Stream ("ADS"). It can be appreciated that ADS are based on the New Technology File System ("NTFS") ADS. In one implementation, the cache tracking tree tracks file regions of the stub file, cached states associated with regions of the stub file, a set of cache flags, a version, a file size, a region size, a data offset, a last region, and a range map.

In one implementation, a cache fill operation can be processed by the following steps: (1) an exclusive lock on can be activated on the cache tracking tree; (2) it can be verified whether the regions to be filled are dirty; (3) the exclusive lock on the cache tracking tree can be downgraded to a shared lock; (4) a shared lock can be activated for the cache region; (5) data can be read from the cloud into the cache region; (6) update the cache state for the cache region to cached; and (7) locks can be released.

In one implementation, a cache read operation can be processed by the following steps: (1) a shared lock on the cache tracking tree can be activated; (2) a shared lock on the cache region for the read can be activated; (3) the cache tracking tree can be used to verify that the cache state for the cache region is not "not cached;" (4) data can be read from the cache region; (5) the shared lock on the cache region can be deactivated; (6) the shared lock on the cache tracking tree can be deactivated.

In one implementation, a cache write operation can be processed by the following steps: (1) an exclusive lock on can be activated on the cache tracking tree; (2) the file can be added to the synch queue; (3) if the file size of the write is greater than the current file size, the cache range for the file can be extended; (4) the exclusive lock on the cache tracking tree can be downgraded to a shared lock; (5) an exclusive lock can be activated on the cache region; (6) if the cache tracking tree marks the cache region as "not cached" the region can be filled; (7) the cache tracking tree can updated to mark the cache region as dirty; (8) the data can be written to the cache region; (9) the lock can be deactivated.

In one implementation, data can be cached at the time of a first read. For example, if the state associated with the data range called for in a read operation is non-cached, then this would be deemed a first read, and the data can be retrieved from the cloud storage provider and stored into local cache. In one implementation, a policy can be established for populating the cache with range of data based on how frequently the data range is read; thus, increasing the likelihood that a read request will be associated with a data range in a cached data state. It can be appreciated that limits on the size of the cache, and the amount of data in the cache can be limiting factors in the amount of data populated in the cache via policy.

A data transformation component 970 can encrypt and/or compress data that is tiered to cloud storage. In relation to encryption, it can be appreciated that when data is stored in off-premises cloud storage and/or public cloud storage, users can require data encryption to ensure data is not disclosed to an illegitimate third party. In one implementation, data can be encrypted locally before storing/writing the data to cloud storage.

In one implementation, the backup/restore component 997 can transfer a copy of the files within the local storage system 990 to another cluster (e.g., target cluster). Further, the backup/restore component 997 can manage synchronization between the local storage system 990 and the other cluster, such that, the other cluster is timely updated with new and/or modified content within the local storage system 990.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1094 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 1002.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 5 GHz radio band at a 54 Mbps (802.11a) data rate, and/or a 2.4 GHz radio band at an 11 Mbps (802.11b), a 54 Mbps (802.11g) data rate, or up to a 600 Mbps (802.11n) data rate for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary"

is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A testing system, comprising:
a processor configured to control a testing procedure that tests operation of a service provided by a data center comprising storage nodes; and
a memory that stores executable instructions that, when executed by the processor, facilitate performance of operations, comprising:
determining a group of storage nodes of the data center as being representative of a primary cluster of nodes of the data center;
based on characteristics of the group of storage nodes, instantiating, separate from the group of storage nodes, a group of test clients that are to store testing data for a testing procedure, wherein the group of test clients is configured to individually store respective portions of the testing data in a distributed fault-tolerant manner; and
configuring the group of test clients to maintain a distributed data store, which is configured to store the respective portions of the testing data, wherein the test clients record the testing data generated during application of the testing procedure, and wherein the testing data comprises snapshot data representative of a state of a test file at a defined time.

2. The testing system of claim 1, wherein the testing procedure models customer workflows at a scale similar to actual conditions witnessed by the data center.

3. The testing system of claim 1, wherein the operations further comprise changing a flow of the testing procedure during operation of the testing procedure.

4. The testing system of claim 1, wherein the operations further comprise managing local access to remote objects.

5. The testing system of claim 1, wherein the operations further comprise adjusting a preference for a type of IO operation based on a defined storage utilization target.

6. The testing system of claim 1, wherein the operations further comprise managing the distributed data store of the group of test clients in the distributed fault-tolerant manner, and monitoring health of the group of test clients.

7. The testing system of claim 1, wherein the operations further comprise storing the testing data to the distributed data store.

8. The testing system of claim 7, wherein the testing data comprises the snapshot data and at least one of: timestamp data representative of a time, IO log data representative of an IO transaction applied to the file, or an IO fingerprint representative of a hash of the IO transaction.

9. The testing system of claim 8, wherein the operations further comprise performing a verify operation that verifies integrity of the file based on a comparison with the IO fingerprint.

10. The testing system of claim 8, wherein the operations further comprise performing a replay operation that, based on a sequence of IO fingerprints, reconstructs the file from an original state to a present state.

11. The testing system of claim 1, wherein the operations further comprise performing a pause operation that pauses the application of the testing procedure, resulting in a paused state.

12. The testing system of claim 11, wherein the operations further comprise performing a resume operation that resumes the application of the testing procedure from the paused state.

13. A non-transitory computer-readable medium comprising instructions that, in response to execution, cause a system comprising a processor to perform operations, comprising:
determining a group of storage nodes of a data center as being representative of a primary cluster of nodes;
based on characteristics of the group of storage nodes, determining a group of test clients that are to store a testing dataset for a testing procedure that tests operation of a service provided by the data center, wherein the group of test clients differs from the group of nodes and is configured to individually store respective portions of the testing dataset in a distributed fault-tolerant manner; and
configuring the group of test clients to maintain a fault-tolerant, distributed data store that records testing data generated during execution of the testing procedure, wherein the testing data comprises snapshot data representative of a state of a test file at a defined time.

14. The non-transitory computer-readable medium of claim 13, wherein the operations further comprise, during operation of the testing procedure, pausing the execution of the testing procedure.

15. The non-transitory computer-readable medium of claim 14, wherein the operations further comprise, during the pausing of the execution of the testing procedure, updating a parameter of the testing procedure and resuming the execution of the testing procedure in accordance with the updated parameter.

16. The non-transitory computer-readable medium of claim 13, wherein the operations further comprise, during the execution of the testing procedure, adjusting a preference for a type of IO operation, causing a defined storage utilization parameter to be reached.

17. A method, comprising:
determining, by a device comprising a processor, a group of storage nodes of a data center as being representative of a primary cluster of nodes of the data center that provides a service;
based on characteristics of the group of storage nodes, determining, by the device, a group of test clients that are separate from the group of storage nodes and that is configured to individually store respective portions of testing data that is generated during a test operation of the service; and configuring, by the device, the group of test clients to maintain a fault-tolerant, distributed database that records testing data generated during execution of a testing procedure wherein the testing data comprises snapshot data representative of a state of a test file at a defined time.

18. The method of claim 17, further comprising performing, by the device, a verify operation that verifies integrity of the test file based on a comparison with an IO fingerprint representative of a state of the test file at a time of creation of the IO fingerprint.

19. The method of claim 17, further comprising performing, by the device, a replay operation that, based on a sequence of IO fingerprints, renders how the file changed to a present state.

20. The method of claim 17, further comprising performing, by the device, a pause operation that pauses the testing procedure being executed by the group of test clients.

* * * * *